Aug. 24, 1954

S. LE R. LEWIS 2,687,509

TESTING INSTRUMENT

Filed April 15, 1953

INVENTOR.
*Sidney L. Lewis*
BY *Victor J. Evans & Co.*

ATTORNEYS

Patented Aug. 24, 1954

2,687,509

UNITED STATES PATENT OFFICE 2,687,509

TESTING INSTRUMENT

Sidney Le Roy Lewis, Dover, N. H.

Application April 15, 1953, Serial No. 348,847

4 Claims. (Cl. 324—53)

This invention relates to a testing instrument or tool, and more particularly to an instrument for use in testing electrical components such as fuses, lamps, circuits, and the like.

The object of the invention is to provide an electrical testing instrument which is compact in construction so that it can be conveniently carried by a person in his pocket or the like whereby various electrical fuses, lamps, circuits, or other parts can be tested as desired.

Another object of the invention is to provide an electrical tester which is in the form of a screwdriver whereby the electrical tester can be turned off to prevent short circuiting when the tool is placed in a kit and wherein the instrument has the normal feel of a screwdriver due to the construction thereof.

A further object of the invention is to provide an electrical testing instrument which is extremely simple and inexpensive to manufacture.

Other objects and advantages will be apparent during the course of the following description.

In the accompanying drawings, forming a part of this application, and in which like numerals are used to designate like parts throughout the same:

Figure 1:
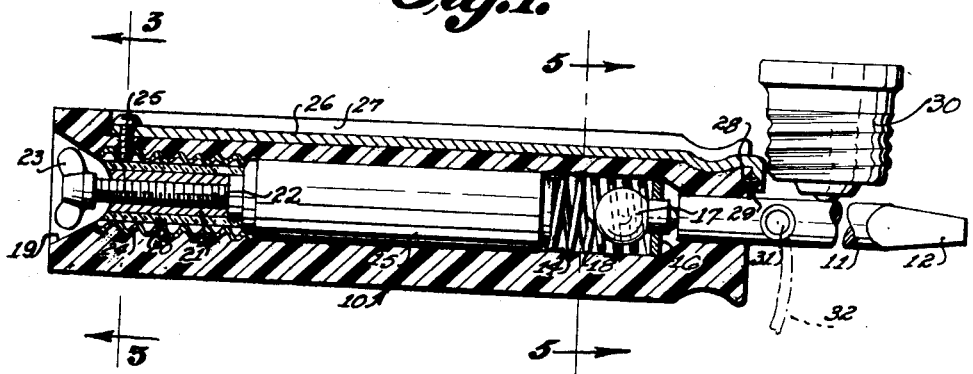
Figure 1 is a longitudinal sectional view taken through the instrument of the present invention, and showing a fuse being tested.
Figure 2:
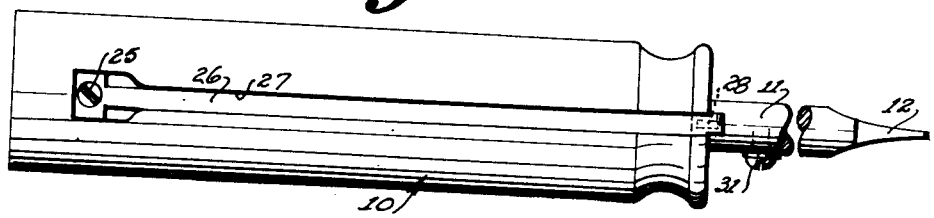
Figure 2 is a top plan view of the instrument of the present invention.

Referring in detail to the drawings, the numeral 10 designates a body or housing which may be fabricated of a suitable transparent material such as plastic, and the body 10 has a shank 11 extending from an end thereof, the shank 11 being provided with a tapered end 12 for engagement with screws. The body 10 is provided with an elongated chamber or bore 14, Figure 1, and snugly seated in the chamber 14 is a conventional battery 15. A disc 16 is arranged within the chamber 14, and a bulb 17 is snugly seated in a central opening in the disc 16. A coil spring 18 is interposed between the disc 16 and the slidable battery 15.

The transparent body 10 is provided with a recess or concave portion 19 for a purpose to be later described. Extending into the body 10 is a pair of sleeves 20 and 21 which may be made of a suitable insulating material. A stud or bolt 22 is arranged in threaded engagement with the inner sleeve 21, and a wind nut 23 is mounted on the outer end of the stud 22 for rotating the stud, the wing nut 23 being seated within the recess 19.

Circumposed on the outer sleeve 20 is a metal collar 24 which has its inner end adapted to abut and electrically engage the battery 15. A screw 25 extends through a portion of the body 10 and into engagement with the collar 24, and a spring metal electrode 26 has one of its ends engaged by the screw 25. The elongated electrode 26 is snugly seated in a slot 27 in the body 10.

For maintaining the electrode 26 in place when it is not being used, a pin 28 extends from an end of the body 10, and the pin 28 is adapted to be engaged in a socket or cut-out 29 in a transverse portion of the electrode 26.

Figure 4:
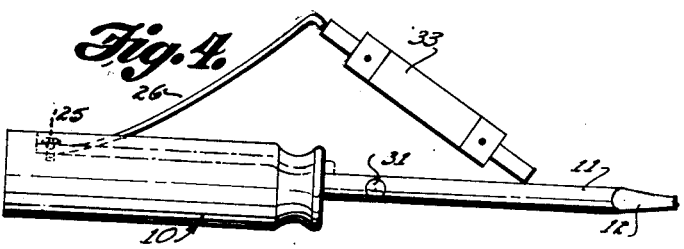
Figure 4 is an elevational view showing a different type of fuse being tested.
Figure 3:
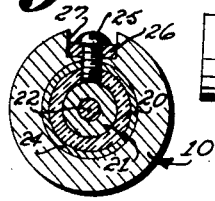
Figure 3 is a sectional view taken on the line 3—3 of Figure 1.
Figure 5:
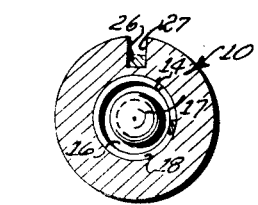
Figure 5 is a sectional view taken on the line 5—5 of Figure 1.

The numeral 30 designates a lamp base or fuse which can be tested by the instrument of the present invention as shown in Figure 1, and extending from the shank 11 is a screw 31. A suitable wire 32 may be connected to the screw 31, and another wire may be connected to the screw 25 whereby circuits can be tested by the instrument of the present invention. In Figure 4 there is shown a different type fuse 33 being tested by the present invention.

From the foregoing it is apparent that a screwdriver tester has been provided which can be used for testing fuses, lamps, circuits and the like. The spring metal electrode 26 is retained in place by the pin 28 engaging the socket 29, Figure 1. The screw 22 actuated by the nut 23 serves as a switch to make the connection between the battery 15 and the electrode 26 so that when the tester of the present invention is thrown in a kit with other tools the battery will not accidentally run out. The base of the lamp 17 touches the screwdriver shank 11. When testing house fuses the electrode 26 need not be lifted up as shown in Figure 1, since the fuse 30 may be placed on the screwdriver shank 11 against the electrode 26 and when the lamp 17 lights the fuse is good.

The tester can also be used for testing circuits by connecting one wire 32 of the circuit to the screw 31 and another wire of the circuit to the screw 25, and in Figure 4 a large size fuse 33 is shown being tested and if the lamp 17 does not light the fuse 33 is defective. The present invention is especially useful to electricians since an electrician carries a screwdriver at all times in his pocket the convenience of having a screwdriver and tester combined is obvious. Further, the present invention is efficient for fuse and continuity testing because no outside current is needed for its use. Also the spring electrode 26 requires no hinge and since the screw 25 and electrode 26 do not extend beyond the sides of the body 10 there will be no interference with normal use of the tool as a screwdriver. Since the wing nut 23 is seated in the recess 19, the user will be able to tap on the end of the body 10 as is often done with a screwdriver. Further, the screwdriver tester of the present invention can be turned off by means of the bolt 22 in order to prevent short circuiting when the tool is placed in a kit, and the screwdriver tester may be struck on the end with pliers or other objects when the occasion demands since there are no test cords projecting from the end of the handle. Further, the tester has the normal feel of a screwdriver because the fuse testing electrode 26 is placed in a groove in the handle.

I claim:

1. An electrical screwdriver tester comprising a hollow body fabricated of transparent material and provided with an elongated chamber, a shank extending from an end of said body and projecting into said chamber, a disc seated in said chamber and provided with a central opening, a bulb positioned in said opening and abutting said shank, a battery positioned within said chamber and spaced from said bulb, a coil spring interposed between said battery and disc, said body have a recess extending inwardly from an end thereof, a pair of sleeves extending into said body, a stud arranged in threaded engagement with the innermost of said sleeves, a wing nut mounted on the outer end of said stud and seated in said recess, a metal collar circumposed on said sleeves and adapted to engage said battery, there being a slot in said body, a spring metal electrode seated in said slot, and a securing element extending through said electrode and engaging said collar.

2. The apparatus as described in claim 1, and further including a pin extending from said body, there being a socket in said electrode for receiving said pin.

3. The apparatus as described in claim 1, and further including a securing element extending from said shank.

4. An electrical screwdriver tester comprising a hollow body fabricated of transparent material and provided with an elongated chamber, a shank extending from an end of said body and projecting into said chamber, a disc seated in said chamber and provided with an opening, a bulb positioned in said opening and abutting said shank, a battery positioned within said chamber and spaced from said bulb, resilient means interposed between said battery and disc, said body having a recess extending inwardly from an end thereof, sleeve means extending into said body, a stud arranged in engagement with said sleeve means, a nut mounted on the outer end of said stud and seated in said recess, a collar circumposed on said sleeve means and adapted to engage said battery, there being a slot in said body, an electrode seated in said slot, and a securing element extending through said electrode and engaging said collar.

References Cited in the file of this patent

UNITED STATES PATENTS

| Number | Name | Date |
| --- | --- | --- |
| 2,534,450 | Kadilak | Dec. 19, 1950 |
| 2,588,559 | Needham | Mar. 11, 1952 |